United States Patent [19]

Smith

[11] Patent Number: 5,125,298
[45] Date of Patent: Jun. 30, 1992

[54] AUTOMATIC WHEEL ASSEMBLY MOUNTING SYSTEM

[76] Inventor: Chalmers O. Smith, 10 Kirks Ct., Rochester, Mich. 48063

[21] Appl. No.: 550,816

[22] Filed: Nov. 14, 1983

[51] Int. Cl.$^5$ ............ B25B 17/00; B25B 23/02; B25B 23/04; B25B 23/06
[52] U.S. Cl. ............ 81/57.37; 29/728; 81/57.36; 81/57.22
[58] Field of Search ............ 221/333; 227/15 C; 81/57.22, 57.32, 57.36, 57.34; 29/728

[56] References Cited

U.S. PATENT DOCUMENTS

| | | | |
|---|---|---|---|
| 2,117,376 | 5/1938 | Strayer | 198/368 |
| 2,570,903 | 10/1951 | Yost | 198/33 |
| 2,691,314 | 10/1954 | Stevens et al. | 81/57.22 X |
| 2,728,092 | 12/1955 | Poupitch | 221/333 X |
| 2,792,139 | 5/1957 | Lloyd | 214/147 |
| 2,903,049 | 9/1959 | Carlson | 157/1 |
| 3,138,286 | 6/1964 | Schott | 221/10 |
| 3,297,199 | 1/1967 | Law | 221/93 |
| 3,321,169 | 5/1967 | Fowler | 248/352 |
| 3,491,427 | 1/1970 | Zimmerman et al. | 29/240 |
| 3,541,900 | 11/1970 | Mosier | 81/57.23 |
| 3,830,387 | 8/1974 | Virnig | 214/331 |
| 4,022,341 | 5/1977 | Lindquist | 214/330 |
| 4,042,139 | 8/1977 | Pernsteiner et al. | 214/331 |
| 4,516,690 | 5/1985 | Andersson | 221/333 |

FOREIGN PATENT DOCUMENTS 677867 8/1979 U.S.S.R. ............ 221/333

*Primary Examiner*—Paul A. Bell

[57] ABSTRACT

An automatic wheel assembly mounting system, for use on a vehicular assembly line, in which an array of fastener members is prepared, corresponding in number and geometric pattern to the array of coacting fastener members on the vehicle hub and to the array of bolt holes on the wheel assembly; a wheel assembly is rotated at an orientation station to bring the bolt holes into angular registry with the arrayed fastener members; the wheel assembly and arrayed fastener members are brought together and moved in registry to a staging position adjacent to but spaced laterally from a vehicle hub positioned at the wheel assembly mounting station on the assembly line and the arrayed fastener members, wheel assembly, and hub are relatively rotated to move the arrayed fastener members, the bolt holes in the wheel assembly, and the coacting fastener members on the hub into angular registry with each other at the staging position; the wheel assembly and arrayed fastener members are thereafter moved laterally onto the hub and the arrayed fastener members are secured to the coacting fastener members on the hub to secure the wheel assembly to the hub.

8 Claims, 12 Drawing Sheets

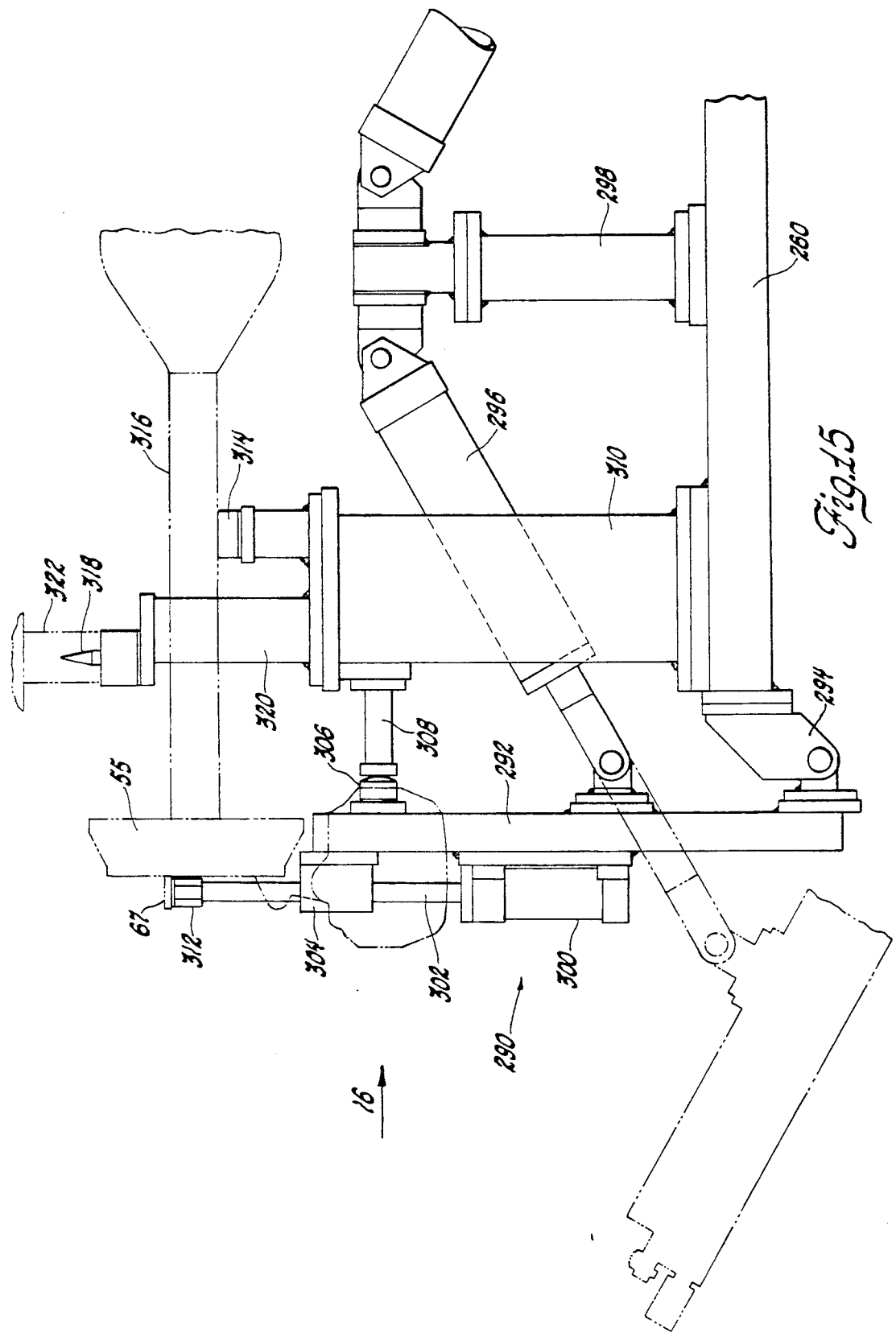

AUTOMATIC WHEEL ASSEMBLY MOUNTING SYSTEM

BACKGROUND OF THE INVENTION

This invention relates to methods and apparatus for mounting wheel assemblies on motor vehicles. It is still the general practice in modern day automotive assembly plants to have an assembly line worker manually mount wheel assemblies on the vehicle wheel hubs. Various devices have been proposed to assist the worker in the mounting operation. These devices include wheel assembly delivery chutes which present the wheel assemblies successively to the worker at the wheel assembly mounting station; nut runners which facilitate the attachment of the nuts to the studs on the vehicle wheel hub; and overhead hoist supported devices which grasp and transport the wheel assemblies and may also embody nut runner mechanisms. However, these devices, at best, reduce the amount of physical effort required by the worker to accomplish the mounting operation. The mounting operation is still basically a manual operation and still, therefore, retains a significant labor cost factor and imposes human limitation on the speed at which the wheel mounting operation can be performed.

SUMMARY OF THE INVENTION

The present invention provides a totally automatic method and apparatus for mounting a wheel assembly to the hub of a vehicle at a work station on an assembly line for that vehicle. The present invention thus eliminates the labor cost factor in the wheel mounting operation and removes the human limitation with respect to the speed at which the mounting operation can be performed.

In the wheel assembly mounting system of the present invention, an array of fastener members is prepared, corresponding in number and geometric pattern to the array of coacting fastener members on the vehicle hub and to the array of bolt holes on the wheel assembly; the wheel assembly and arrayed fastener members are moved to a staging position adjacent to but spaced laterally from a vehicle hub positioned at the work station on the assembly line and the arrayed fastener members, wheel assembly, and hub are relatively rotated to move the arrayed fastener members, the bolt holes in the wheel assembly, and the coacting fastener members on the hub into angular registry with each other at the staging position; the wheel assembly and arrayed fastener members are moved laterally onto the hub; and the arrayed fastener members are secured to the coacting fastener members on the hub to secure the wheel assembly to the hub.

According to a further feature of the invention, each wheel assembly is delivered to an orientation station where it is rotated to a position in which the bolt holes are radially oriented relative to the arrayed fastener members, whereafter the wheel assembly and arrayed fastener members are moved, in registry, to the staging position for mounting on the vehicle hub. In the disclosed embodiments, the required extent of rotation of the wheel assembly is determined by directing an optic beam at the bolt hole circle and stopping the wheel assembly rotation upon passage of the optic beam through a bolt hole.

In one embodiment of the invention, the hub is rotated to a position of registry with the wheel assembly and arrayed fastener members prior to the mounting operation.

In another embodiment of the invention, the angular position of the hub is sensed and the wheel assembly and arrayed fastener members are rotated to a position of registry with the hub prior to the mounting operation. The sensing of the angular position of the hub is achieved by camera means which optically determine the radial orientation of the hub and generate a programmed signal to rotate the wheel assembly and arrayed fastener members to a position of registry with the coacting fastener members on the hub.

According to a further feature of the invention, the means for preparing the fastener member array comprises a feeder mechanism having an outboard face and means defining a plurality of fastener receptacles at spaced locations on that outboard face, and the fastener member array is prepared by transporting fastener members from a fastener member source for loading into each of the fastener receptacles and thereafter moving the loaded fastener members, in unison, away from the outboard face of the feeder mechanism to deliver an array of fastener members to further fastener handling equipment disposed adjacent the outboard face. In the disclosed embodiments of the invention, the feeder mechanism includes a plurality of parallel bores opening in the outboard face respectively adjacent each fastener receptacle on that outboard face and the fastener members are moved in unison away from the outboard face for delivery to further fastener handling equipment by a plurality of ejector mechanisms positioned respectively in the parallel bores.

According to a further feature of the invention, the handling and mounting of the wheel assemblies or other work pieces is facilitated by a novel boom assembly. The invention boom assembly comprises a boom arm, mounted for rotation about a fixed axis to allow the free end of the arm to be moved between a plurality of work stations, and a head assembly carried at the free end of the boom arm. The head assembly includes a plurality of fastener runners, arranged in an array corresponding in number and geometric pattern to the array of fastener members required to mount the wheel assembly or other work piece, and gripper means actuable to selectively grasp and release the work piece to facilitate the handling and mounting operations.

According to yet another feature of the invention, an apparatus is provided for mounting work pieces to support structures using fastener members coacting with fastener means on the support structure. In the invention mounting apparatus, a feeder mechanism operates to assemble an array of fastener members corresponding in number and geometric pattern to the coacting fastener means on the support structure; the fastener member array is delivered, together with a work piece, to a staging position adjacent a support structure; the fastener member array and support structure are relatively moved to achieve registry between the arrayed fastener members and the coacting means on the support structure; and the work piece is moved from the staging position to the support structure and mounted on the support structure by securing the respective fastener members to the respective coacting fastener means on the support structure.

BRIEF DESCRIPTION OF THE DRAWINGS

FIG. 15 is a fragmentary view of a hub orienter mechanism used in the alternate wheel assembly mounting system of FIG. 12.

DESCRIPTION OF THE PREFERRED EMBODIMENTS

The FIGS. 1-12 Embodiment

Figure 1:
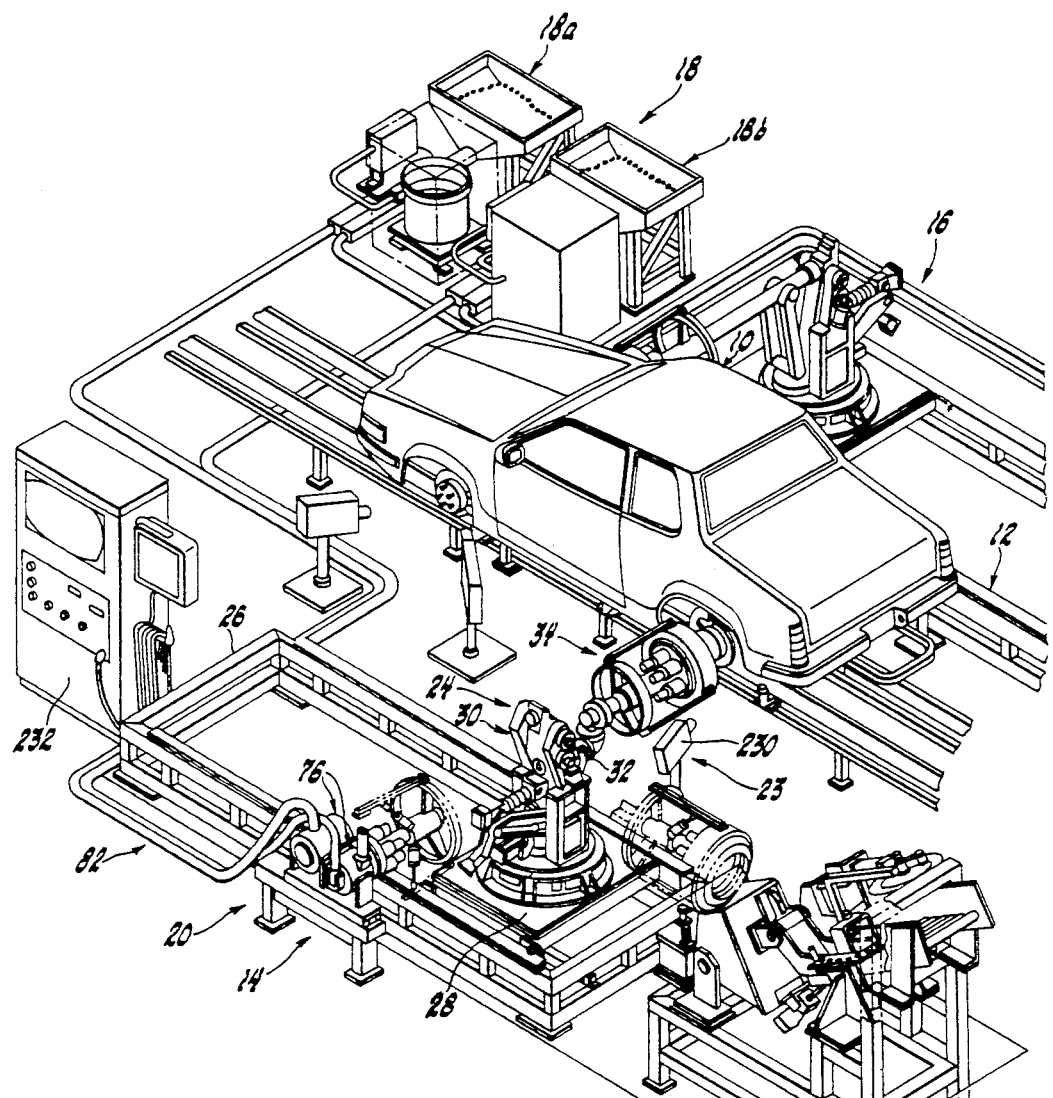
FIG. 1 is a perspective view of one embodiment of the overall wheel assembly mounting system of the present invention.

The wheel assembly mounting system seen in FIG. 1 is shown in conjunction with an automobile assembly line in which a motor vehicle 10, in process of assembly, is moved by a conveyor 12 progressively along the assembly line from work station to work station. Vehicle 10 is seen stopped on the assembly line at a work station at which wheel assemblies will be mounted to the front and rear hubs of the vehicle by a pair of wheel assembly mounting systems, 14 and 16, disposed at opposite sides of the vehicle and each arranged to mount wheel assemblies on the front and rear hubs on a respective side of the vehicle.

The two wheel assembly systems are identical, except for hand, and only the nearest system 14 will be described in detail. The wheel assembly system 14, broadly considered, includes a source of fasteners 18 (shared in common with far wheel assembly mounting system 16), a fastener feeder station 20, a wheel assembly orienter station 22, a hub orientation sensing assembly 23, and a boom assembly 24 mounted for movement between feeder station 20, wheel orienter station 22, and the wheel assembly mounting work station on the assembly line.

Boom assembly 24 includes a track structure 26 extending lengthwise of a vehicle positioned at the wheel assembly mounting work station on the assembly line; a carriage 28 mounted for reciprocal, linear movement along track structure 26; a multi-axis robot 30 mounted on carriage 28 and having a boom arm 32; and a head assembly 34 carried on the free end of boom arm 32.

Figure 2:
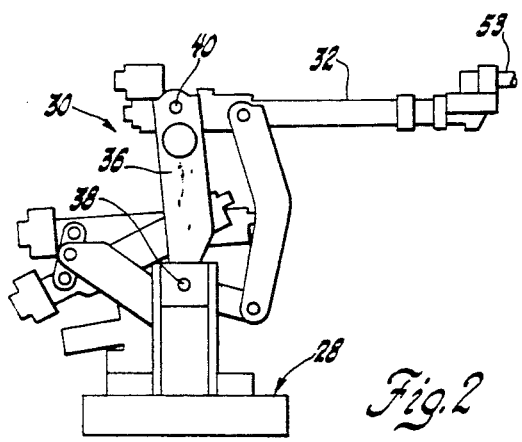
FIG. 2 is a somewhat schematic view of a robot used in the mounting system of FIG. 1.

Robot 30 may take various forms and may, for example, comprise a KUKA industrial robot Model No. IR 601/60 available from KUKA, Schweissanlagen + Roboter, GmbH, P. O. Box 431280, Zugspitzstr. 140, D-8900 Augsburg 43, West Germany. The referenced KUKA robot, best seen in FIG. 2, provides rotation about six axes including rotary movement of the entire robotic structure about a primary vertical axis; rotary movement of tower structure 36 about horizontal axis 38 to provide extension and retraction of boom arm 32; rotary movement of boom arm 32 about horizontal axis 40 to provide raising and lowering of the boom arm; and selective rotary movement about three wrist axes 42, 44 and 46 (FIG. 3).

Figure 3:
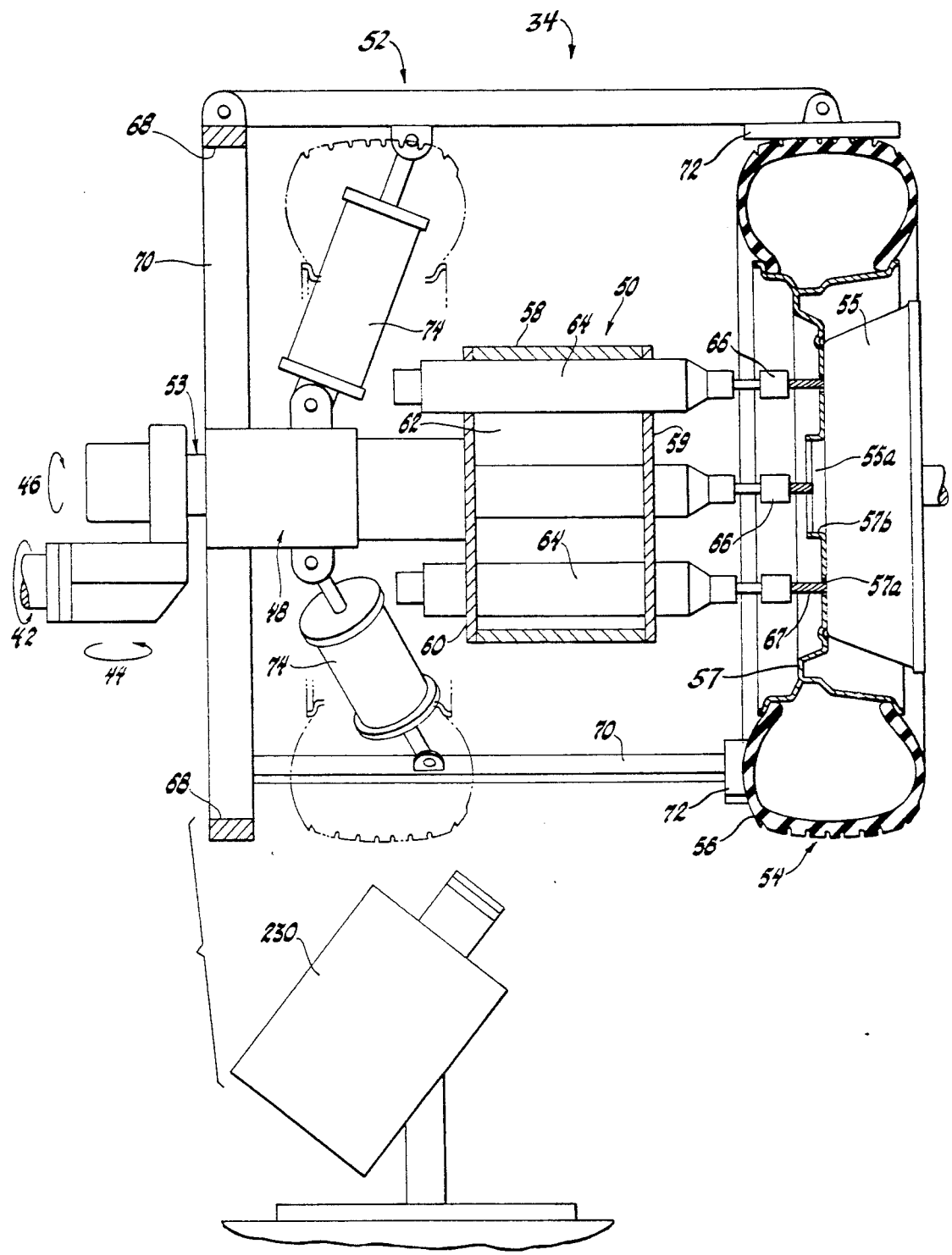
FIG. 3 is a fragmentary cross-sectional view of a head assembly used in the mounting system of FIG. 1.
Figure 4:
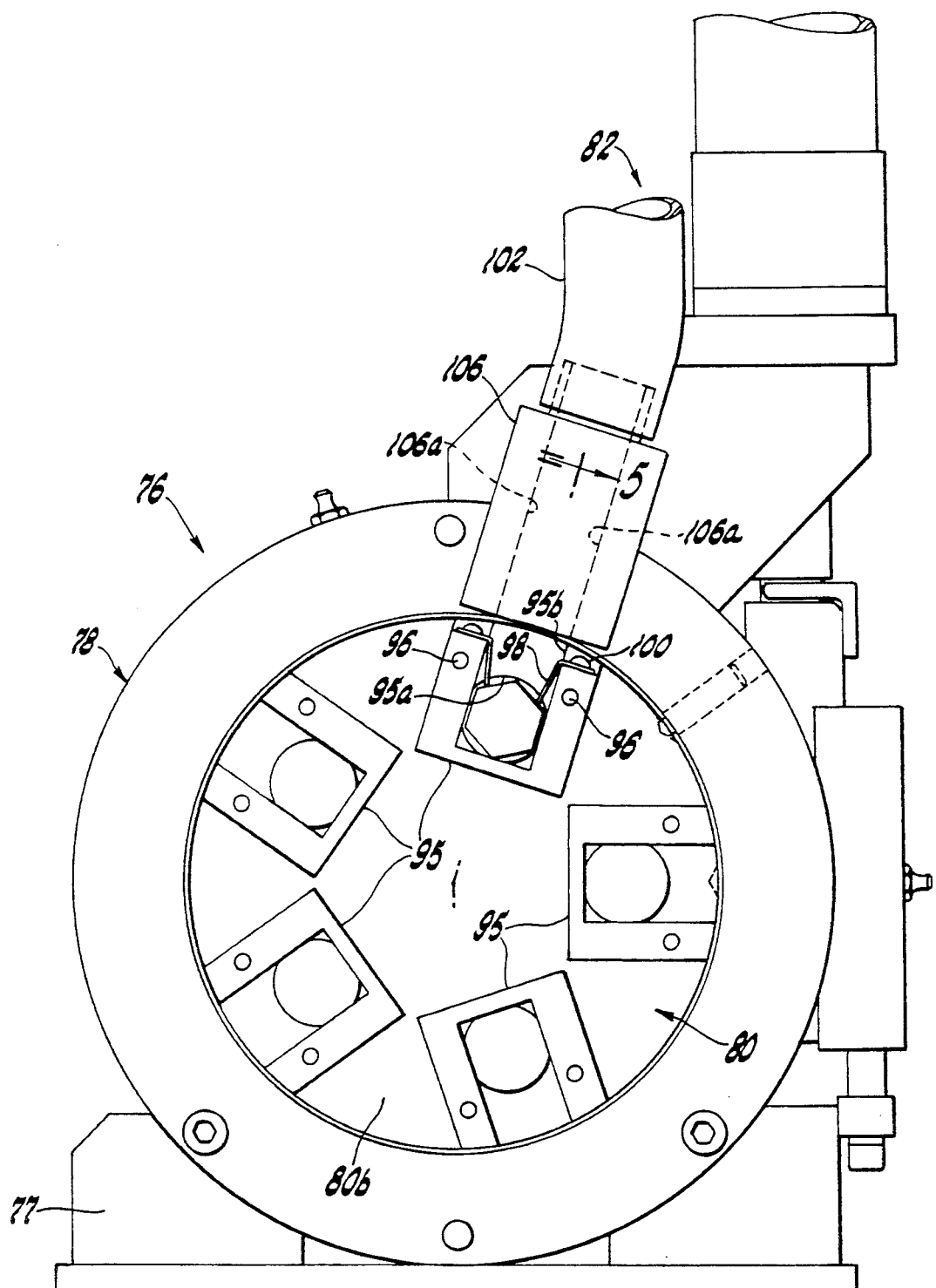
FIG. 4 is an end elevational view of a feeder mechanism used in the mounting system of FIG. 1.
Figure 5:
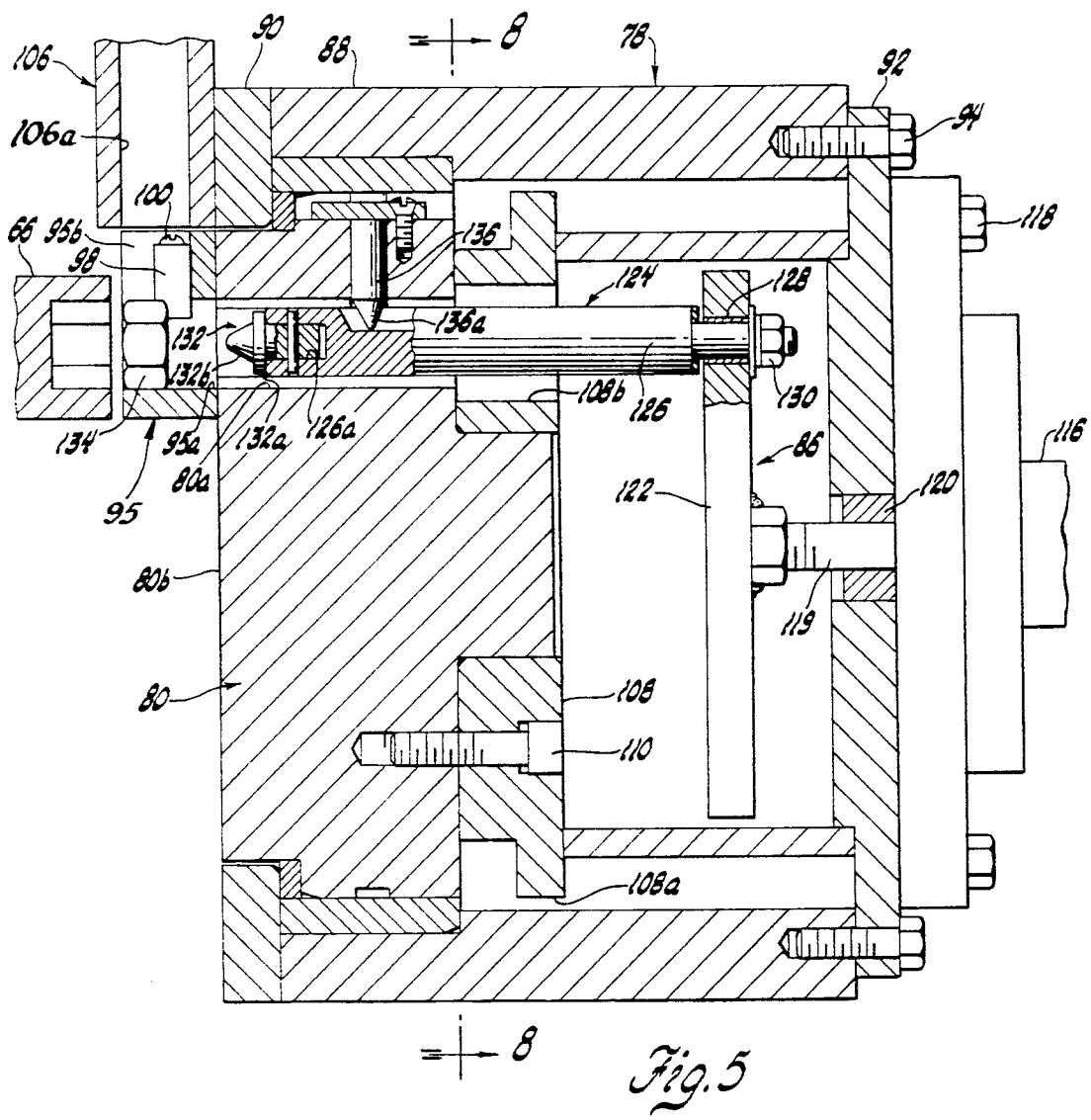
FIG. 5 is a cross-sectional view taken on line 5—5 of FIG. 4.

Head assembly 34, as best seen in FIG. 3, includes a central shaft assembly 48, a nut runner assembly 50, and a gripper assembly 52.

Central shaft assembly 48 is secured to the final output drive shaft 53 of robot 30 and forms an operative extension of that shaft. Head assembly 34 is seen in FIG. 3 in the process of mounting a wheel assembly 54 on the left rear hub 55 of a vehicle on the assembly line. Wheel assembly 54 includes a tire 56 and a wheel 57. Wheel 57 includes a plurality of bolt holes 57a located on a bolt hole circle, and a central opening 57b for co-action with a central locating portion 55a of the vehicle hub.

Nut runner assembly 50 is secured to the free end of central shaft assembly 48 and includes a cylindrical member 58, end plates 59 and 60 suitably secured to the opposite ends of cylindrical member 58 to form a closed cylindrical chamber 62, and a plurality of nut runners 64 extending through suitable apertures in end plates 59 and 60 and each including a socket 66 at its free end. The nut runners correspond in number and geometric pattern to the array of studs 67 on the vehicle hub and to the array of bolt holes 57a in the wheel of the wheel assembly. For example, in a typical automotive application, there are five nut runners arranged in a uniformly circumferentially spaced hexagonal pattern. Nut runners 64 may take various forms and may, for example, comprise a pneumatic type nut runner available from Rotor Tool Company of Cleveland, Ohio as part number M101YSGG115.

Gripper assembly 52 includes a ring member 68 secured by spokes 70 to central shaft assembly 48; a plurality of gripper arms 70 pivotally mounted at their inboard ends to circumferentially spaced locations on ring member 68 and carrying pivotally mounted pads 72 at their outboard ends; and a cylinder assembly 74 for each gripper arm pivotally connected at its inboard end to shaft assembly 48 and at its outboard end to a respective gripper arm 70.

At least one fastener feeder 76 is positioned at fastener feeder station 20. Fastener feeder 76, as best seen in FIGS. 4–8, includes a base structure 77, a housing 78, a drum or magazine member 80 positioned within housing 78, a fastener supply system 82, a ratcheting mechanism 84, and an ejector mechanism 86.

Housing 78 is suitably cradled in base structure 77 and includes a hollow cylindrical casing 88, an annular member 90 suitably secured to one end of casing 88, and a cover 92 secured by bolts 94 to the other end of casing 88 to close the casing at that end.

Feeder or magazine member 80 is generally cylindrical and is mounted for rotary movement in the open end of casing 88. Magazine 80 has a plurality of parallel, through axial bores 80a opening at circumferentially spaced locations in the outboard magazine face 80b. A plurality of fastener receptacles 95 are positioned on outboard face 80b respectively adjacent the outboard face opening of each bore 80a. Each receptacle 95 comprises a block member secured by screw bolts 96 to magazine outboard face 80b and including a central bore 95a coaxial with the respective magazine bore 80a and a radially extending slot 95b generally coaxial at its radially inner end with bore 95a and opening at its radially outer end at the radially outer edge of magazine member 80. A pair of spring fingers 98 are secured at their radially outer ends to block 95 by screws 100 and extend radially inwardly therefrom to dispose their free inner ends in slot 95b adjacent the periphery of bore 95a.

Fastener supply system 82 includes a hose 102 communicating with fastener source 18 and a feeder fitting 106 secured to the outboard face of housing annular member 90 and including a central radially extending throughbore 106a communicating at its radially outer end with hose 102 and at its radially inner end with the slot 95b of a receptacle 95.

Ratcheting mechanism 84 includes a ratchet 108 secured by bolts 110 to the inboard face of magazine 80, a hydraulic cylinder 112 carried by casing 88, and a spring loaded, pivotally mounted pawl 114 actuated by cylinder 112 and positioned to engage ratchet teeth 108a to selectively advance the ratchet and selectively rotate magazine 80 to bring successive receptacles 95 into radial alignment with feeder fitting 106.

Figure 7:
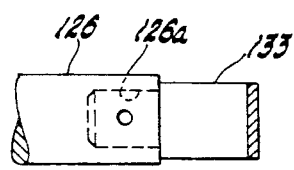
FIG. 7 is a fragmentary view of an alternative tooling configuration for the invention feeder mechanism.
Figure 6:
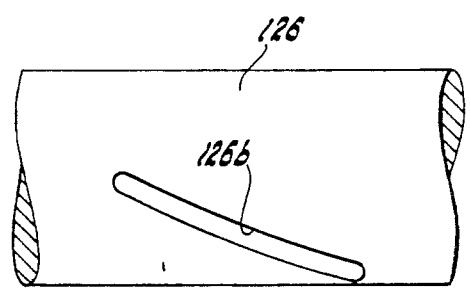
FIG. 6 is a fragmentary detail view of a portion of an ejector assembly used in the invention feeder mechanism.
Figure 8:
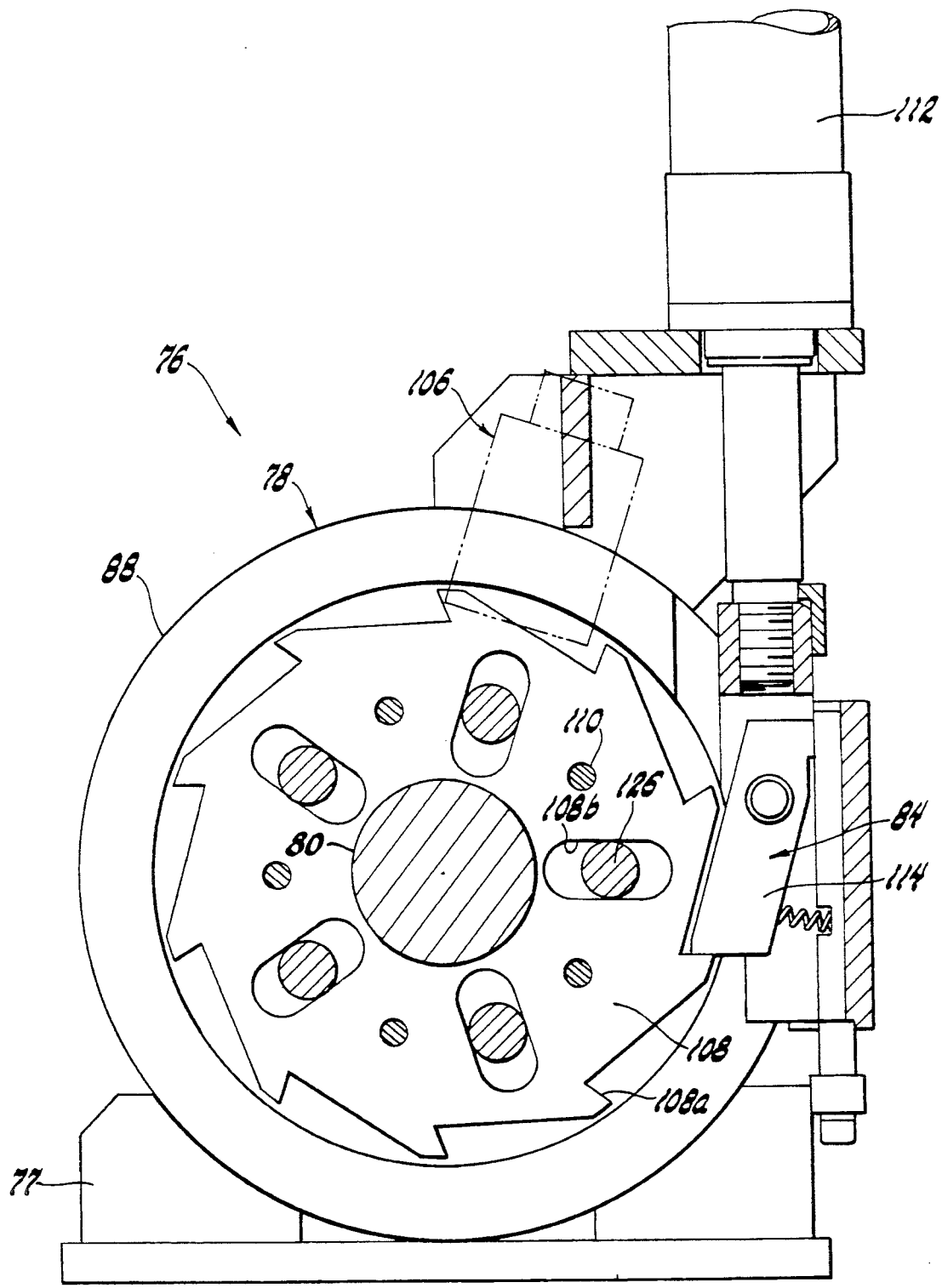
FIG. 8 is a cross-sectional view of the invention feeder mechanism taken on line 8—8 of FIG. 5.

Ejector mechanism 86 includes a cylinder 116 secured to housing cover 92 by bolts 118 and having a piston rod 119 passing through a central bushing 120 in cover 92; a circular gang plate 122 coaxially secured to the free end of piston rod 119; and a plurality of ejector assemblies 124 carried by gang plate 122. Each ejector assembly includes a shaft or plunger 126 passing through a respective slot 108b in ratchet member 108 and slideably positioned in a respective bore 80a of magazine 80. Each plunger 126 is necked down at its inboard end for passage through a bushing 128 in gang plate 122. A nut 130 engages the threaded inboard end of plunger 126 to secure the plunger to gang plate 122 while allowing the plunger to rotate relative to the gang plate. The outboard end of plunger 126 has a central recess 126a receiving a suitable tooling insert 132. When the feeder is set up to handle nuts, such as the hex nut seen at 134 in FIG. 5, tooling insert 132 includes a rim portion 132a and a conical lead portion 132b dimensioned to enter the central aperture of nut 134. When the fastener feeder is set up to handle bolts, a tooling insert such as seen at 133 in FIG. 7 is employed and a modified receptacle 95 (not illustrated) is employed.

In operation, the fastener feeder is loaded by successively actuating the ratcheting mechanism to bring successive receptacles 95 into radial alignment with feeder fitting 106. As each receptacle moves into radial alignment with the feeder fitting, a nut or other fastener is fed, by suction or pressure, through hose 102 and through fastener fitting 106 into the receptacle slot 95b. As the nut moves radially inwardly in slot 95b, it pushes resiliently past the inner ends of spring fingers 98 which thereafter spring back to position and trap the nut in the radially inner end of the slot in axial alignment with bore 95a. After all of the receptacles have been loaded, ejector cylinder 116 is actuated to move the plungers 126, in unison, outwardly in bores 80a to cause conical lead portions 132b to enter hex nuts 134 and push the nuts outwardly into the sockets 66 of nut runners 64 which have previously been moved by robot 30 into a position adjacent the outboard face 80b of magazine 80 in circumferential registry with the bores 95a of receptacles 95. As the plungers move outwardly in bores 80a, a helical groove 126b (FIG. 6) in each plunger 126 is engaged by the tapered tip 136a of a driver pin 136 carried by magazine 80 so that the plungers rotate as they move outwardly to rotate nuts 134 and allow the hexagonal external surface of the nuts to seek registration with the hexagonal internal surface of the sockets 66. Nut runners 64 are spring loaded to allow socket 66 to retreat in the face of the advancing nuts until registry is achieved, and the annular outboard face of rim portions 132a of tooling inserts 132 are roughened to insure that the rotation of the plungers is transferred positively to the nuts.

Preferably, more than one fastener feeder 76 is provided at fastener feeder station 20 with each fastener feeder connected to a source of separate and different fastener elements. For example, as seen in FIG. 1, one fastener feeder 76 may be connected to a source of fasteners 18a and another feeder 76 may be connected to a source of different fasteners 18b. This arrangement allows the nut runners to be respectively loaded with a first type of nut from a first fastener feeder 76 for a first wheel assembly application and a second type of nut from a second fastener feeder 76 for a second wheel assembly application on the same assembly line. This arrangement also allows the nut runners to be loaded with a mixture of different types of nuts (for example, three standard nuts from a first fastener feeder 76 and two chromed nuts from a second fastener feeder 76) in situations where a single wheel assembly requires two different kinds of fastener elements. Also, although it is normally desirable from a cost and simplicity standpoint to employ only one feeder hose 102 for each fastener feeder 76 and ratchet the feeder magazine until all of the receptacles have been loaded through the single hose 102, it might be preferable in certain applications, where speed is of the essence and/or cost is not a critical factor, to employ a separate hose for each receptacle so that the ratcheting mechanism can be eliminated and all receptacles can be loaded at the same time.

After the nuts have been loaded into the nut runners, robot 30 is actuated to retract boom arm 32 and move head assembly 34 away from the outboard face of the fastener feeder, whereafter the robot is further actuated to rotate the entire robotic structure about the primary vertical axis and move head assembly 34 to wheel assembly orienter station 22.

Figure 9:
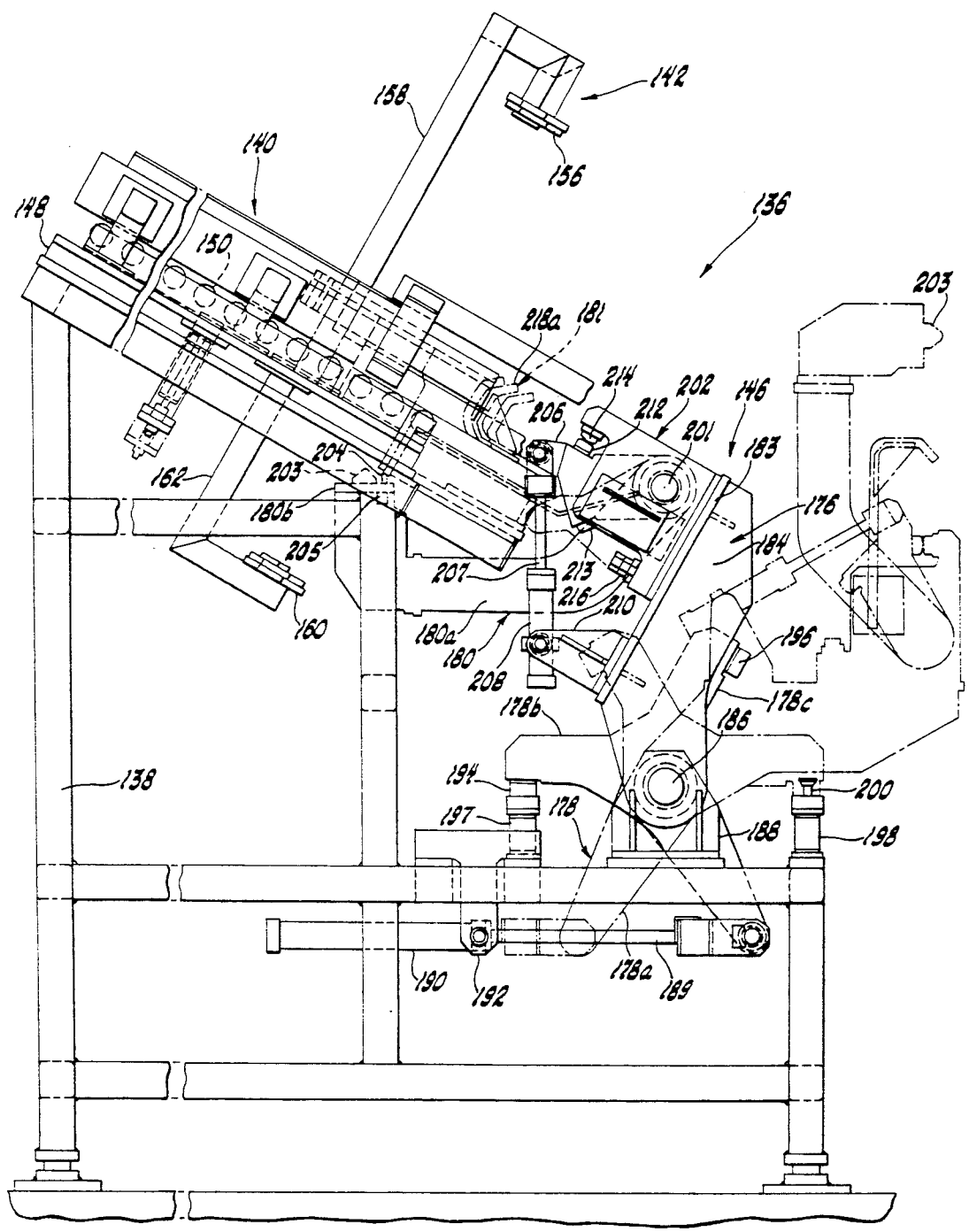
FIGS. 9 and 10 are elevational and plan views respectively of a wheel orienter mechanism used in the invention wheel assembly mounting systems.
Figure 10:
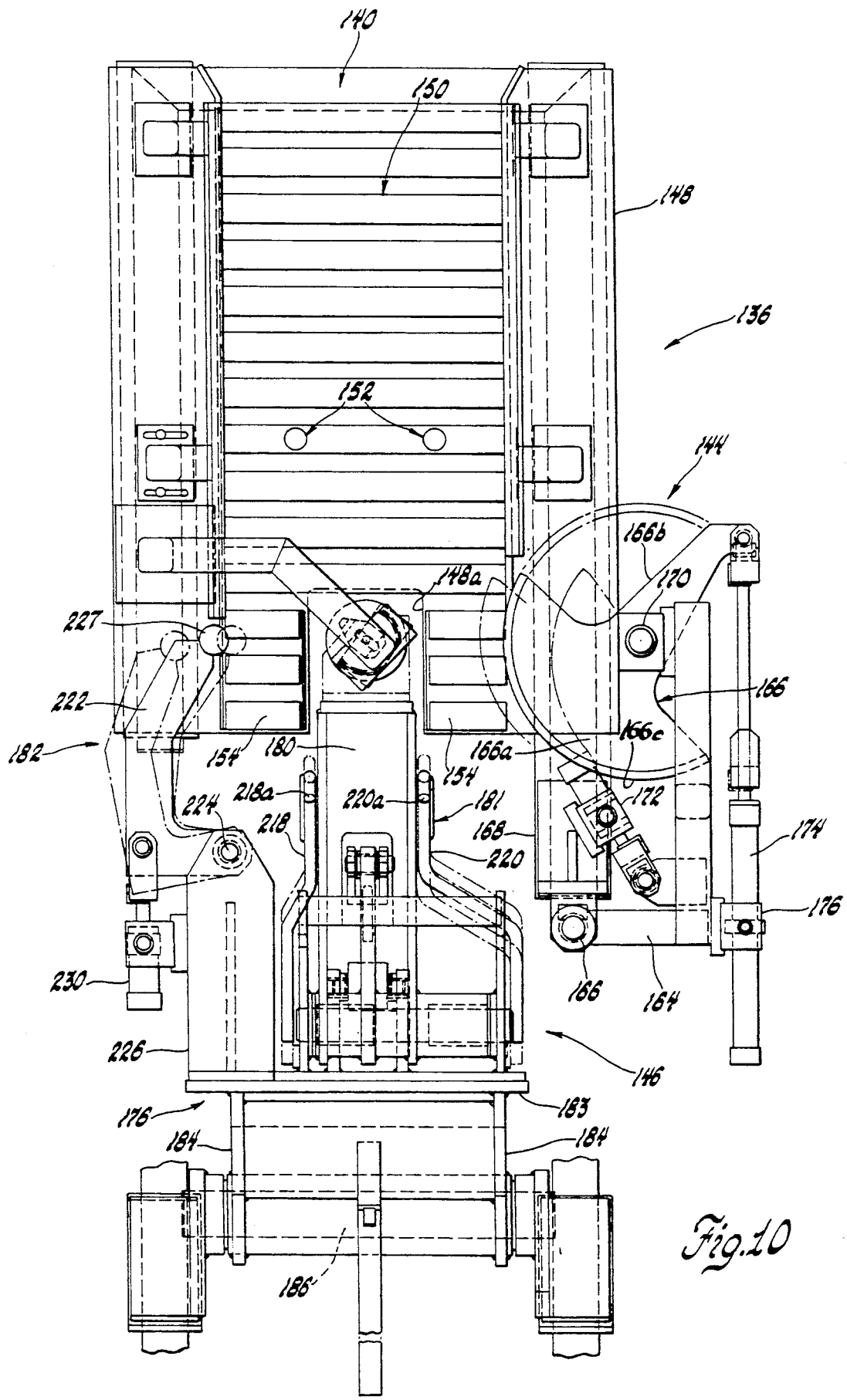

A wheel orienter assembly, seen generally at 136 in FIGS. 9 and 10, is positioned at wheel orienter station 22. Wheel orienter assembly 136 includes a frame structure 138, a wheel assembly delivery chute 140, an optic eye assembly 142, a roller drum assembly 144, and an upender assembly 146.

Wheel assembly delivery chute 140 is supported in angled position on frame structure 138 and includes a chute frame structure 148, a plurality of rollers 150, and a pair of escapement cylinders 152 positioned between adjacent rollers 150. The lower end of chute frame structure 148 is centrally cut-away at 148a and mini-rollers 154 are provided at opposite sides of cut-out 148a.

Optic eye assembly 142 is carried by delivery chute 140 and includes an optic transmitter unit 156, positioned by a support arm 158 generally over the lower end of delivery chute 140, and an optic receptor unit 160 positioned by a support arm 162 beneath the lower end of delivery chute 140 in line with the optic beam from transmitter 156. Optic transmitter unit 156 and optic receptor unit 160 are commercially available devices which are well known in the art.

Roller drum assembly 144 is also carried by delivery chute 140 and includes a support arm 164 and a roller drum member 166. Support arm 164 is L-shaped and is pivoted at one end at 166 to a bracket 168 integral with delivery chute 140. Roller drum member 166 includes an arcuate drum portion 166a and an actuator arm portion 166b. Roller drum member 166 is pivotally mounted at 170 on the free end of support arm 164. Pivot axis 170 is at the center of radius of the arcuate peripheral surface 166c of arcuate drum portion 166a. A cylinder 172 extends between bracket 168 and arm 164 and is operative to pivot arm 164, and thereby roller drum member 166, about axis 167. Another cylinder 174 extends between a bracket 175 on support arm 164 and the free end of actuator arm portion 166b of roller drum member 166. Cylinder 174 is operative to pivot roller drum member 166 about axis 170 to allow arcuate surface 166c of arcuate drum portion 166a to move along a circular trace centered on axis 170.

Upender assembly 146 includes a support frame structure 176, a triangular control linkage 178, an orienter arm 180, a wheel assembly abutment guide 181, and a clamp assembly 182.

Support frame structure 176 includes a plate member 183 and flanges 184 secured to plate member 183. Flanges 184 are pivotally mounted at their lower ends to wheel orienter frame structure 138 on a pivot shaft 186 carried by frame brackets 188.

Triangular control linkage 178 is also journaled o pivot shaft 186 and is rigidly secured to flanges 184 so as to be movable with support frame structure 176. Linkage 178 includes an actuation arm portion 178a and stop arm portions 178b and 178c. Arm portion 178a extends downwardly from pivot shaft 186 and is engaged at its free lower end by the piston rod 189 of a cylinder 190 carried by a frame bracket 192. Stop cushion members 194 and 196 are provided at the free ends of stop arm portions 178b and 178c for respective co-action with stop cylinders 197 and 198 carried by frame structure 136. Cylinders 197 and 198 each include a plunger 200 for cushioning the engagement of the respective stop arm portion and generating a control signal for cylinder 190.

Figure 11:
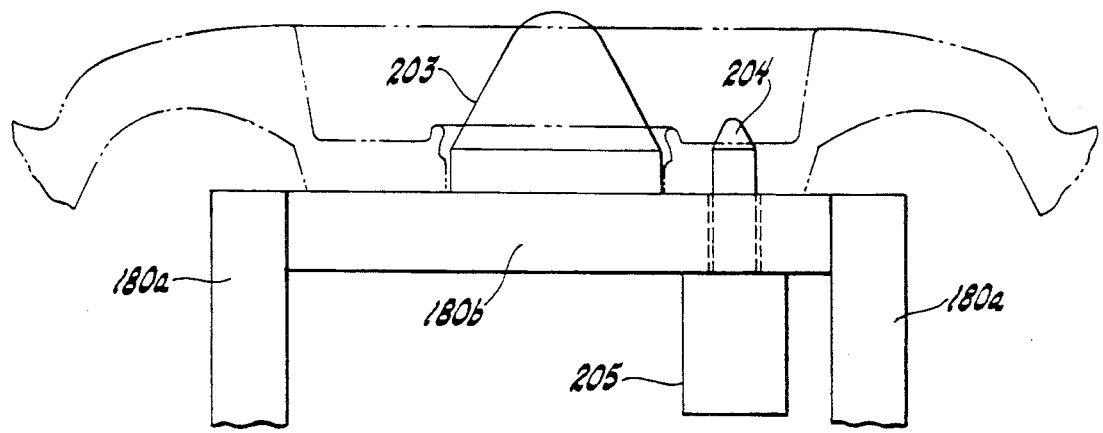
FIG. 11 is a fragmentary detail view of a wheel locking mechanism used in the wheel orienter mechanism of FIGS. 9 and 10.

Orienter arm 180 is pivotally mounted at one end on a pivot shaft 201 carried by a bracket structure 202 integral with plate member 183. Arm 180 is constituted by two parallel arm members 180a joined at their free ends by a bridge piece 180b (FIG. 11). A locator pin 203 is positioned centrally on bridge piece 180b and a locking pin 204 is positioned eccentrically on bridge piece 180b at a distance from the center line of locator pin 203 corresponding to the radius of the bolt circle of the wheel assembly Locking pin 204 is constituted by the tapered free end of the piston rod of a cylinder 205 secured to the underside of bridge member 180b. An actuator arm 206, journaled on shaft 201 and mounted for movement with arm 180, is engaged at its free end by the piston rod 207 of a cylinder 208 mounted on a bracket 210 integral with plate member 183. Actuator arm 206 carries stop cushion members 212 and 213 for respective co-action with stop cushion members 214 and 216 carried by bracket structure 202.

Wheel assembly abutment guide 181 comprises a pair of parallel rods 218 and 220 mounted on support frame structure 176 and bent upwardly at their free ends 218a, 220a for engagement by the leading peripheral edge of the tire 56 of a wheel assembly 54 moving down chute 140. Rods 218 and 220 may be adjusted relative to support frame structure 176 to accommodate various wheel assembly sizes.

Clamp assembly 182 comprises a generally L-shaped arm 222 pivoted at one end at 224 to a bracket 226 carried by plate member 183 and carrying a head member 227 at its free end for clamping engagement with the outer periphery of a wheel assembly 54. A cylinder 228 extends between bracket 226 and the knee of arm 222 to selectively pivot the arm about axis 224.

In operation, a wheel assembly 54 is delivered to the upper end of delivery chute 140 and slides down the chute on rollers 150 until the forward peripheral edge of the tire of the wheel assembly engages escapement cylinders 152 to stop the wheel assembly in an on-deck position. Cylinders 152 are thereafter timely retracted to allow the wheel assembly to continue on down the chute until the forward peripheral edge of the tire of the wheel assembly engages stop rods 218, 220. The wheel assembly is now positioned with its central wheel opening 57b generally overlying chute frame cut-out 148a. Cylinder 208 is now actuated to pivot orienter arm 180 upwardly about pivot shaft 201 and move locator pin 203 into the central wheel opening 57b of the wheel assembly. Cylinder 172 is now actuated to pivot arm 164 about axis 166 and move arcuate drum portion 166a of roller drum 166 into contact with the outer diameter of the tire 55 of the wheel assembly, whereafter cylinder 174 is actuated to cause roller drum 166 to rotate about axis 170 so that arcuate peripheral surface 166c of drum portion 166a rollably engages the outer diameter of the tire and causes the wheel assembly to rotate about locator pin 203. The rotation of the wheel assembly is facilitated by the rolling engagement of the tire sidewalls with mini-rollers 154. The location of the optic beam emitted by transmitter 156 is adjusted for any given wheel assembly size so that the beam is located on the bolt hole circle of the wheel. The wheel assembly is rotated until a bolt hole 57a appears directly beneath the optic transmitter, at which time the optic beam passes through the bolt hole and is received by receptor 160 which generates an instantaneous signal to deactivate cylinder 174 and stop the rotation of the wheel assembly. The angular location of the optic beam, relative to a twelve o'clock or a top dead center position of the wheel assembly, precisely matches the angular location of a corresponding bore 80a of the magazine 80 of the fastener feeder so that the bolt holes of the wheel assembly are now radially oriented relative to the nuts in the nut runners of the head assembly. Cylinder 172 is now actuated to move roller drum 166 away from the oriented wheel assembly and cylinder 228 is actuated to move head member 227 of clamp arm 222 into clamping engagement with the outer diameter of the tire of the oriented wheel assembly. Cylinder 205 is also actuated at this time to move locking pin 204 upwardly into a bolt hole of the wheel assembly to further guard against inadvertent rotation of the wheel assembly. The bolt hole into which pin 204 extends is preferably generally diametrically opposed to the bolt hole with which the optic beam coacts. Cylinder 190 is now actuated to pivot upender assembly 146, together with the oriented wheel assembly, upwardly about pivot shaft 186 to move the upender assembly and oriented wheel assembly to the phantom line position of FIG. 9 and present the wheel assembly to the head assembly 34 of boom assembly 24.

As the oriented wheel assembly assumes the phantom line position of FIG. 9, robot 30 is actuated in a sense to extend boom arm 32 and position the nut runners 64 adjacent the outboard face of the wheel assembly with sockets 66 in respective juxtaposition to the bolt holes of the wheel assembly. Since the wheel assembly has previously been oriented relative to the nut runners, the various sockets 66 are in precise registry with the various bolt holes. Depending on the application and on tolerances, the outer tips of the sockets may or may not actually engage the wheel of the wheel assembly. Cylinders 74 are now retracted to pivot gripper arms 70 inwardly and bring pads 72 into engagement with circumferentially spaced locations on the outer diameter of the tire 55 of the wheel assembly, whereby to firmly grasp the wheel assembly Robot 30 is now actuated in a sense to retract boom arm 32, whereby to pull the grasped wheel assembly clear of locator pin 203 and locking pin 204. Robot 30 is now actuated in a sense to rotate the entire robotic structure about its primary vertical axis and move head assembly 34, and the gripped wheel assembly, to the wheel assembly mounting work station on the assembly line.

Hub orientation sensing assembly 23 is a vision guidance system comprising a camera 230 and a Robot Controller 232 operative to receive a signal from camera 230 and transmit a guide signal to robot 30. Camera 230, as best seen in FIG. 3, is positioned adjacent the rear hub of a vehicle stopped on the assembly line at the wheel assembly mounting station, immediately below the position assumed by the head assembly and gripped wheel assembly preparatory to the wheel assembly mounting operation. Camera 230 may, for example, comprise a Panasonic Model No. A-4110 Solid State Camera available from The Panasonic Company, a Division of Matsushita Corporation of America, having a Detroit office at 23975 Research Drive, Farmington Hills. Mich. 48024. Robot Controller 232 may, for example, comprise a Robot Controller Model No. AT32V available from Automatix Incorporated, 23880 Industrial Park Drive, Farmington, Hills, Mich. 48024.

In operation, with a vehicle positioned at the wheel assembly mounting work station on the assembly line and head assembly 34, with the gripped wheel assembly, positioned adjacent but outboard of the rear hub 55 of the vehicle (as seen in the phantom line position of FIG. 3), camera 230 is activated to photograph the rear hub of the vehicle and transmit a signal to Robot Controller 232 indicative of the angular orientation of the studs 67 on the hub. Robot Controller 232 processes a signal from camera 230 and, in turn, transmits a guide signal to robot 30 embodying characteristics indicative of the angular orientation of studs 67 relative to the known angular orientation of the bolt holes of the wheel assembly and the nuts positioned adjacent the outboard face of the wheel assembly in registry with the respective bolt holes. Robot 30 receives the guide signal and moves about one or more axes to move head assembly 34 rotationally and, if necessary, linearly to move the wheel assembly into a position in which the bolt holes and aligned nuts are coaxial with, and in precise registry with, the studs 67 on the hub. As soon as this registry is achieved, robot 30 is actuated in a sense to extend boom arm 32 and move the head assembly and gripped wheel assembly to the solid line position of FIG. 3 in which studs 67 project through the bolt holes 57a of the wheel assembly for engagement with the tips of the sockets 66 of nut runners 64. The nut runners, as indicated, are spring loaded so that, if necessary, they can give linearily as they move into contact with the studs as the wheel assembly is mounted to the hub. As soon as the solid line position of FIG. 2 is achieved, nut runners 64 are activated to run the nuts 134 onto studs 67 and securely mount the wheel assembly to the hub. After the nuts have been properly torqued, cylinders 74 are actuated to move arms 70 apart to release the wheel assembly, whereafter robot 30 is actuated in a sense to retract boom arm 32 and pull head assembly 34 laterally away from the mounted wheel assembly, whereafter robot 30 is actuated in a sense to rotate the entire robotic structure about the primary vertical axis to move the head assembly back to a position adjacent fastener feeder 76. Head assembly 54 thereafter picks up a new fastener member array from feeder 76; is thereafter rotated through ninety degrees to wheel orienter station 22 where it receives a new wheel assembly; and is thereafter rotated through ninety degrees while simultaneously moving down track structure 26 on carriage 28 to position the new wheel assembly adjacent the front hub of the vehicle, whereafter the angular orientation of the front hub is sensed, the robot thereafter moves the gripped wheel assembly in a sense to bring the bolt holes and arrayed nuts into precise registry with the studs, and the wheel assembly is mounted on the hub. Since the front hub has freedom of movement about multiple axes, two cameras are required to accurately locate the hub and the angular orientation of the studs. The cameras are angled with one camera 234 looking back at the hub from a position ahead of the hub and the other camera 236 looking ahead at the hub from a position behind the hub. The two pictures taken by these cameras are combined and compared and a composite signal, precisely locating the angular orientation of the studs and the angular disposition of the hub itself, is transmitted to control 232 for transmittal to robot 30.

While wheel assembly mounting system 14 is thus mounting wheel assemblies on the left rear and left front hubs of a vehicle stopped at the wheel assembly mounting station, wheel assembly mounting system 16 is similarly mounting wheel assemblies on the right front and right rear hubs of the vehicle.

The FIGS. 12-16 Embodiment

Another embodiment of the wheel assembly mounting system of the invention is shown in FIGS. 12 through 16. The system of FIGS. 12 through 16 is similar to the system of FIGS. 1 through 11 with the exception that the boom assembly is greatly simplified; the vehicle is elevated at the wheel assembly mounting work station on the assembly line to facilitate the wheel assembly mounting operations; and final registration between the arrayed fasteners, the wheel assembly bolt holes, and the studs on the hub is achieved by selective rotation of the hub rather than selective rotation of the head assembly and gripped wheel assembly. Elements that are identical in the two embodiments have identical reference numerals. Specifically, head assembly 34, fastener feeder 76, and wheel orienter assembly 136 are identical in the two embodiments.

The boom assembly in the FIG. 12 through 16 embodiment, seen generally at 238, includes a central pedestal 240 mounted on a sub-carriage 242 mounted in turn on a carriage 244. Carriage 244 is mounted on track structure 26. A turntable 246 is rotatably mounted on pedestal 240 and a fixed arm member 248 is secured to the top of turntable 246. A boom arm member 250 is telescopically received in fixed arm member 248. A cylinder 252 is mounted on fixed arm member 248 and engages one end of boom arm 250 to selectively telescope boom arm 250 relative to fixed arm 248. Another cylinder 253 is positioned to raise and lower turntable 246. Head assembly 34 is carried on the free end of boom arm 250.

Figure 13:
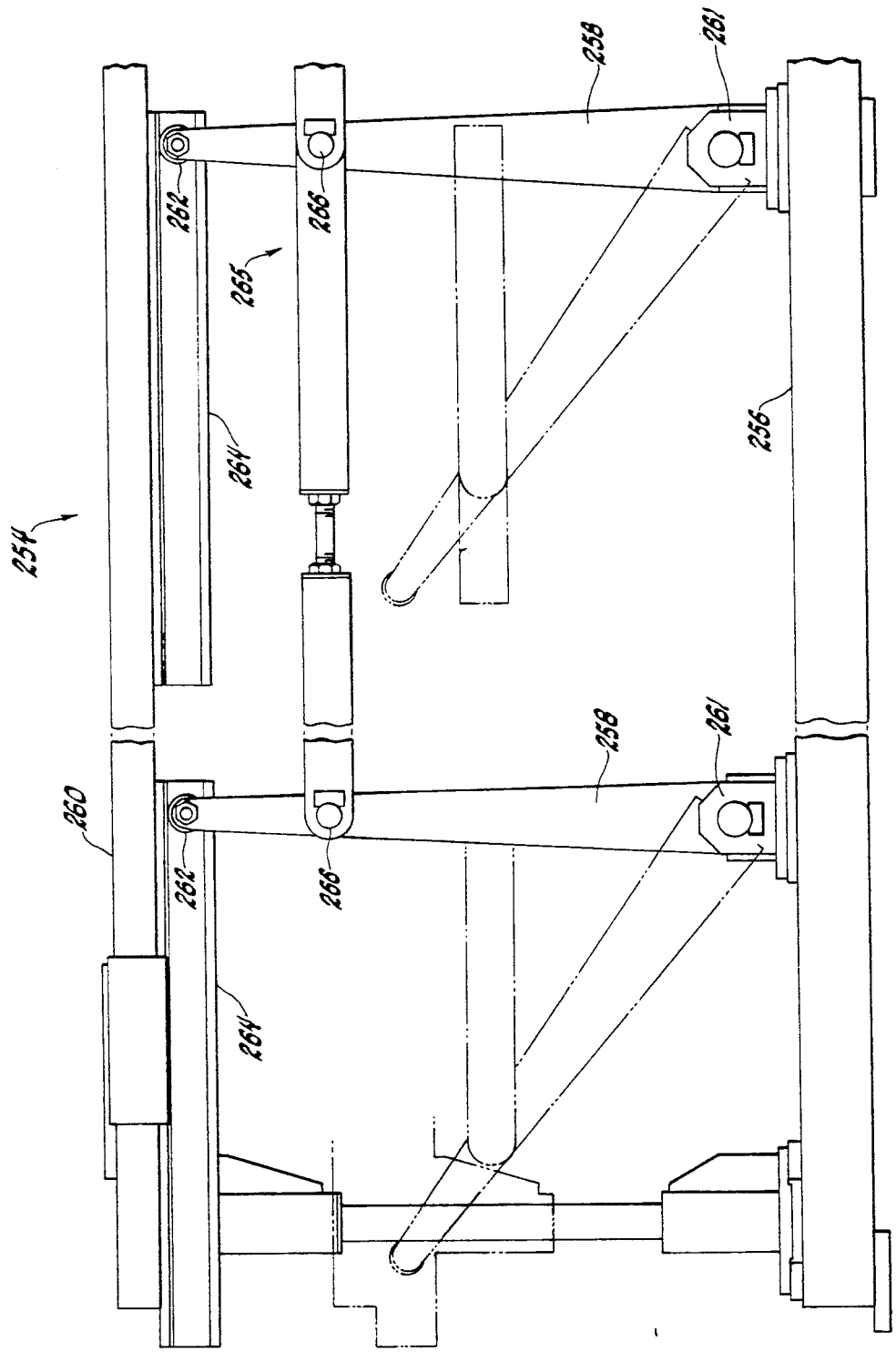
FIGS. 13 and 14 are views of the forward and rearward sections respectively of a vehicle elevator mechanism used in the alternate wheel assembly mounting system of FIG. 12.
Figure 14:
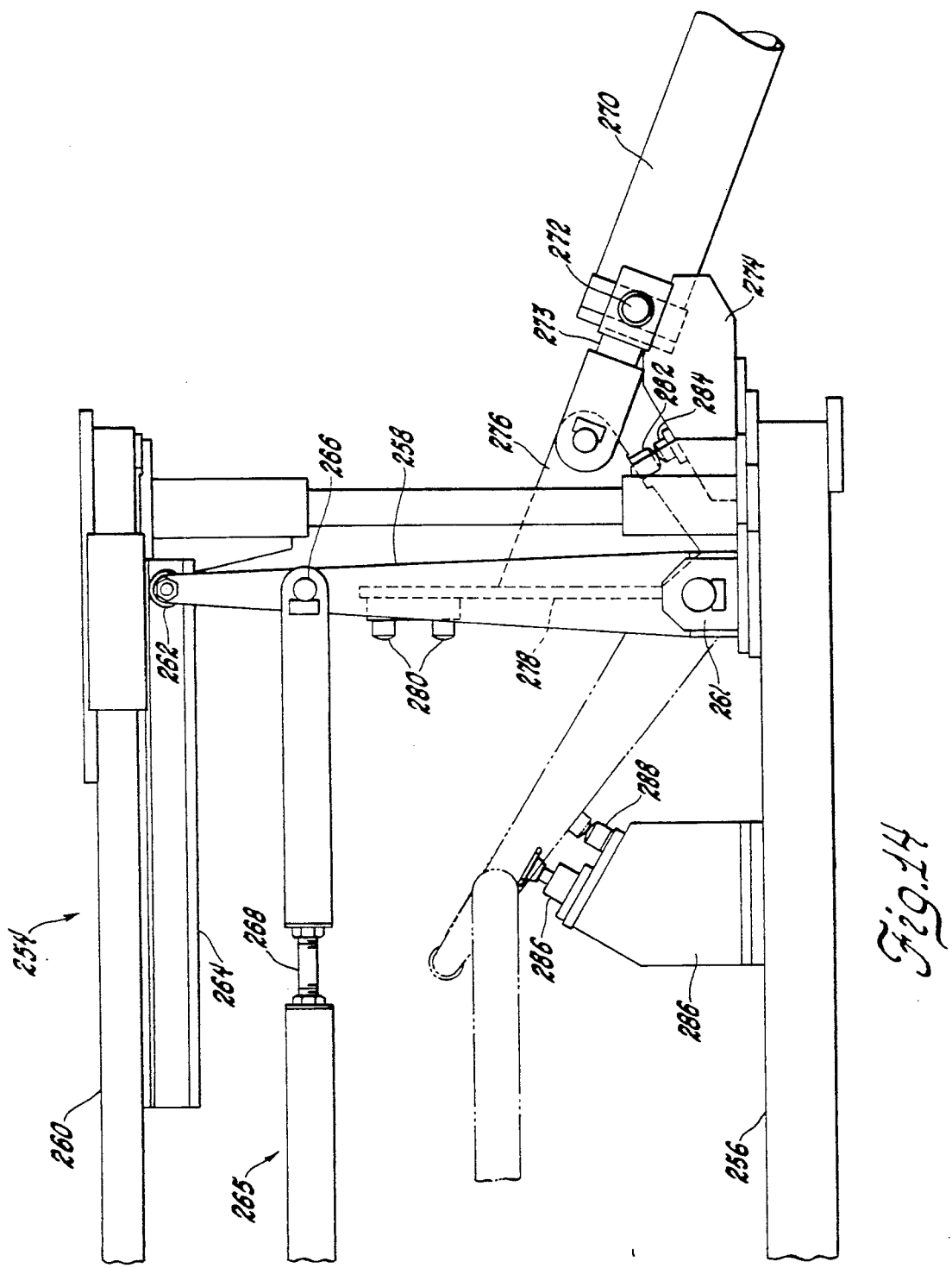

As indicated, the vehicle in the FIG. 12 through 16 embodiment is elevated at the wheel assembly mounting work station. The elevator mechanism, generally indicated at 254, is best seen in FIGS. 13 and 14. Elevator mechanism 254 includes a base member 256, pivotal columns 258, and a vehicle support platform 260. Columns 258 are pivotally mounted at their lower ends on brackets 261 on base member 256 and carry rollers 262 at their upper ends received in slide racks 264. Slide racks 264 are secured to the under side of vehicle support platform 260 A guide linkage 265 is pivotally connected at 266 to each of the pivotally supported columns. The guide linkage 265 includes a linkage 268 by which the length of the linkage can be adjusted.

Elevator mechanism 254 is raised and lowered by a hydraulic cylinder 270. Cylinder 270 is pivotally mounted at 272 to a bracket 274 and has its piston rod 273 pivotally secured to a bracket 276 welded to a plate member 278 extending rigidly between the rightmost pivotal columns 258 in FIG. 14. Plate member 278 carries spaced stop elements 280, and a further stop element 282 is carried on bracket 276. When cylinder 270 is fully retracted, stop element 282 engages a stop element 284 on bracket 274 to signal full elevation of the elevator mechanism. A flange 286 secured to base member 256 is equipped with a hydraulic stop cylinder 286 and a rigid stop element 288. When cylinder 270 is fully extended, stop elements 280 respectively engage hydraulic stop cylinder 286 and stop element 288. Stop cylinder 286 cushions the stoppage of the elevator mechanism and generates a signal to stop the extension of cylinder 270.

Figure 16:
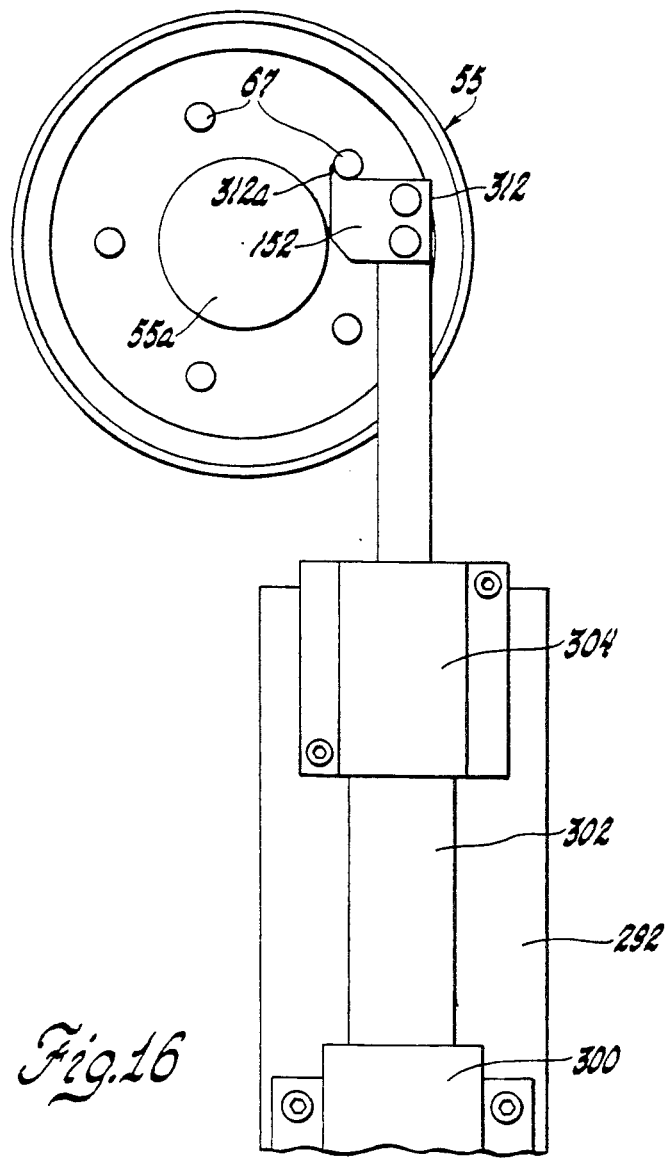
FIG. 16 is a view of the hub orienter mechanism of FIG. 15 looking in the direction of the arrow 16 in FIG. 15.
Figure 12:
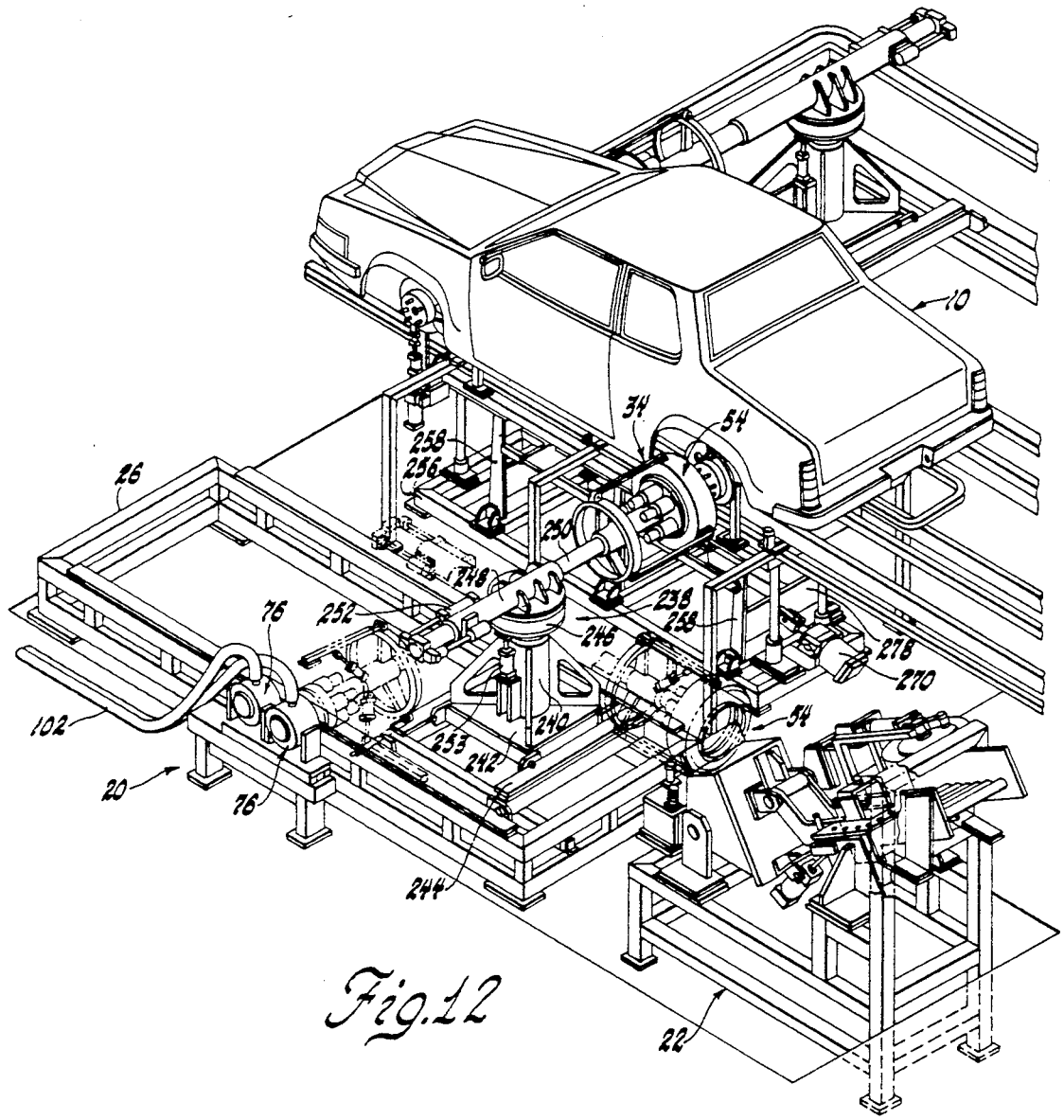
FIG. 12 is a perspective view of an alternate embodiment of the invention wheel assembly mounting system.

FIG. 15 is an end view of the vehicle support platform 260. Platform 260 carries four hub orienter assemblies 290, one for each hub of the vehicle. The hub orienter assembly 290 seen in FIG. 15 relates to the left rear hub of the vehicle. Each orienter assembly 290 includes an orienter arm 292 pivotally mounted at its lower end to a bracket 294 secured to platform 260; a cylinder 296 pivotally mounted at one end to a post 298 centrally upstanding from platform 260 and pivotally mounted at its other end to orienter arm 292 at a location above the pivot axis of the arms; and a cylinder 300 secured to arm 292 in an upstanding position and including a piston rod 302 extending upwardly along the arm and passing slidably through a guide member 304 carried by the arm. A stop member 306 on arm 292 co-acts with a stop member 308 on a post 310 upstanding from elevator platform 260 to limit and define the raised position of the orienter arm. The free or upper end of piston rod 302 carries a head member 312. As best seen in FIG. 16, head member 312 includes an arcuate hook portion 312a adapted to co-act with the studs 67 on hub 55. Specifically, with the hub orienter arm in its raised position, cylinder 300 retracted, and a hub 55 positioned over the orienter assembly, cylinder 300 is extended to raise rod 302. As rod 302 moves upwardly, hub portion 312a of head 312 seeks out and picks up the first stud 67 that it encounters and moves the stud to a predetermined angular position as determined by the stroke of the piston rod. The final angular position of the engaged stud relative to the twelve o'clock or top dead center position precisely matches the angular position of a corresponding bore 80a of the magazine 80 of the fastener feeder and also precisely matches the angular position to which the corresponding bolt hole in the wheel assembly is moved by the wheel orienter.

Platform 260 is also provided with tooling to locate the vehicle axle in relation to the platform. The tooling will differ from vehicle type to vehicle type and even from front to rear axles. As depicted in FIG. 15, the vehicle axle locating tooling includes a saddle member 314 carried on top of post 310 and adapted to engage the underside of the rear axle 316 of the vehicle and a tapered frame locator pin 318 carried atop a subpost 320 upstanding from post 310 and adapted to enter a locating hole in the frame 322 of the vehicle.

In the operation of FIG. 11 through 15 embodiment, the vehicle hub is oriented to the bolt holes of the wheel assembly and the arrayed fastener members prior to the arrival of the head assembly and gripped wheel assembly at the wheel hub. Specifically, as head assembly 34 is moved first to fastener station 20 to pick up an array of fastener members and then to wheel orienter station 22 to pick up an oriented wheel assembly, a vehicle is moved down the assembly line to the wheel assembly mounting station and cylinder 270 is retracted to raise platform 260 with saddle members 314 and locator pins 318 coacting with the vehicle axles and frames to accurately locate the vehicle axles relative to the platform. As the platform reaches its raised position, cylinder 296 is retracted to move orienter arm 292 to its raised position and cylinder 300 is extended to allow header member 312 to engage a stud on the hub and move the hub to its position of orientation relative to the wheel assembly bolt holes and the arrayed fastener members. Cylinder 300 is then retracted and cylinder 296 is extended to return orienter arm to its lowered position, whereafter head assembly 34, carrying the gripped and oriented wheel assembly, arrives at the staging position adjacent the hub. Cylinder 252 is thereafter extended to extend boom arm 250 and mount the wheel assembly on the hub, and nut runners 64 are actuated to run the nuts onto the studs and mount the wheel assembly to the hub. The head assembly then retreats from the mounted wheel assembly and returns to the fastener station to receive another fastener member array, whereafter it moves to the wheel orienter station to receive another oriented wheel assembly and is moved down track 26 to a location adjacent the left front hub of the vehicle. The left front hub has been previously oriented to the wheel assembly and fastener elements so that the wheel assembly may immediately be positioned on the hub and the nuts tightened to securely mount the wheel assembly to the hub.

The present invention will be seen to provide a totally automatic method and apparatus for mounting wheel assemblies to a motor vehicle in an assembly line operation. The present invention thus eliminates the labor cost factor in the wheel assembly mounting operation, eliminates the possibility of human error in the mounting operation, and removes the human limitation with respect to the speed at which the mounting operation can be performed.

Although preferred in embodiments of the invention have been illustrated and described in detail it will be apparent that various changes may be made in the disclosed embodiments without departing from the scope or spirit of the invention.

The embodiments of the invention in which an exclusive property or privilege is claimed are defined as follows:

1. An apparatus for assembling fasteners in a particular array for subsequent delivery to further fastener handling equipment, said apparatus comprising:
   (a) a source of fasteners;
   (b) a feeder mechanism having an outboard face;
   (c) means defining a plurality of fastener receptacles at spaced locations on said outboard face;
   (d) means operative to transport fasteners from said source for loading into each of said receptacles; and
   (e) means operative to move the loaded fasteners, in unison, away from said outboard face, whereby to deliver an array of fasteners to further fastener handling equipment disposed adjacent said outboard face.

2. An apparatus for assembling fasteners in a particular array for subsequent delivery to further fastener handling equipment, said apparatus comprising:
   (a) a source of fasteners;
   (b) a feeder mechanism having a plurality of parallel bores opening at spaced locations on an exposed outboard face of said mechanism;
   (c) a plurality of ejector assemblies respectively disposed in said bores;
   (d) means operative to supply fasteners from said source and position them on said outboard face adjacent to and in coaxial alignment with each bore opening;
   (e) means operative to move said ejector assemblies, in unison, outwardly in said bores to move the positioned fasteners, in unison, axially away from said outboard face, whereby to deliver an array of fasteners to further fastener handling equipment disposed adjacent said outboard face.

3. An apparatus for assembling fasteners in a particular array for subsequent delivery to further fastener handling equipment, said apparatus comprising:
   (a) a source of fasteners;
   (b) a drum member mounted for rotation about its central axis;
   (c) a conduit extending from said source to a discharge end located adjacent the periphery of said drum at an end face thereof;
   (d) a plurality of fastener receptacles formed at circumferentially spaced locations on said end face and each including a through axial bore and a radially extending passage communicating at its radially inner end with the axial bore and opening at its radially outer end adjacent the periphery of said drum member;
   (e) means for rotating said drum to bring successive receptacles into angular alignment with the discharge end of said conduit;
   (f) means for moving fasteners through said conduit and radially inwardly through the radial passage in each receptacle and into the axial bore of that receptacle as the receptacles are successively brought into angular alignment with the conduit discharge end, whereby to load the receptacles;
   (g) a plurality of parallel axially extending bores formed in said drum and respectively opening in said end face in axial alignment with the axial bore of a respective receptacle;
   (h) a plunger positioned in each bore; and
   (i) means for moving said plungers, in unison, axially in said bores to move said plungers into the axial bores in the receptacles and move the loaded fasteners, in unison, axially out of said receptacles and away from said end face, whereby to deliver an array of fasteners to further fastener handling equipment disposed adjacent said end face.

4. An apparatus according to claim 3 wherein said source of fasteners comprise nuts.

5. An apparatus for assembling fasteners in a particular array for subsequent delivery to further fastener handling equipment, said apparatus comprising:
   (a) a source of fasteners;
   (b) a drum member mounted for rotation about its central axis;
   (c) a fastener supply system extending from said source to a discharge end located adjacent to the periphery of said drum at an end face thereof;
   (d) a plurality of fastener receptacles positioned at circumferentially spaced locations on said end face and opening radially outwardly;
   (e) means for rotating said drum to bring successive receptacle into angular alignment with the discharge end of said fastener supply system;
   (f) means for moving fasteners through said fastener supply system and radially inwardly into each receptacle as the receptacles are successively brought into angular alignment with the fastener supply system discharge end, whereby to load the receptacles; and
   (g) ejector means for moving the loaded fasteners, in unison, axially out of said receptacles and away from said end face, whereby to deliver an array of fasteners to further fastener handling equipment disposed adjacent said end face.

6. An apparatus according to claim 5 wherein said ejector means comprises:
   (h) a plurality of parallel axially extending bores formed in said drum and respectively opening in said end face adjacent each receptacle;
   (i) an ejector assembly positioned in each bore; and
   (j) means for actuating said ejector assemblies, in unison, to eject the loaded fasteners.

7. An apparatus according to claim 6 wherein said ejector means includes assemblies for imparting a rotary movement to said fasteners as they are moved axially out of said receptacles, whereby to allow the fasteners to seek registration with suitable coacting receptacles on the further fastener handling equipment.

8. An apparatus according to claim 7 wherein said means for imparting rotary movement comprises a helical groove in each ejector assemblies and a driver pin engageable in each said groove so that the ejector assemblies are rotated as they are moved axially.

* * * * *